(12) United States Patent
Dietrich et al.

(10) Patent No.: US 7,475,820 B2
(45) Date of Patent: Jan. 13, 2009

(54) READER FOR READING COMPUTER-GENERATED LITHOGRAMS

(75) Inventors: Christoph Dietrich, Heidelberg (DE); Kay Schulte-Wieking, Heidelberg (DE); Robert Thomann, Heidelberg (DE); Steffen Scheibenstock, Stuttgart (DE)

(73) Assignee: tesa scribos GmbH, Heidelberg (DE)

( * ) Notice: Subject to any disclaimer, the term of this patent is extended or adjusted under 35 U.S.C. 154(b) by 111 days.

(21) Appl. No.: 10/910,249

(22) Filed: Aug. 2, 2004

(65) Prior Publication Data
US 2005/0247788 A1  Nov. 10, 2005

(30) Foreign Application Priority Data
May 10, 2004  (DE) .................. 20 2004 007 636 U (51) Int. Cl.
*G06K 7/10* (2006.01)
(52) U.S. Cl. ...................................... 235/454
(58) Field of Classification Search ............... 235/454, 235/462.34, 457
See application file for complete search history.

(56) References Cited
U.S. PATENT DOCUMENTS

| | | | | |
|---|---|---|---|---|
| 3,946,370 A | * | 3/1976 | Schmidt et al. ............. | 365/125 |
| 5,306,899 A | * | 4/1994 | Marom et al. ............... | 235/382 |
| 5,386,106 A | * | 1/1995 | Kumar ....................... | 235/380 |
| 6,177,683 B1 | | 1/2001 | Kolesar et al. | |
| 6,330,975 B1 | | 12/2001 | Bunte et al. | |
| 6,616,043 B2 | * | 9/2003 | Zazzu et al. ........... | 235/462.01 |
| 2002/0023961 A1 | * | 2/2002 | Itou et al. .............. | 235/472.01 |
| 2002/0088861 A1 | * | 7/2002 | Durbin ................... | 235/472.01 |

FOREIGN PATENT DOCUMENTS
WO  WO 02/31749  4/2002

* cited by examiner

*Primary Examiner*—Daniel A Hess
(74) *Attorney, Agent, or Firm*—Proskauer Rose LLP (57) ABSTRACT

A reader for reading computer-generated lithograms which are written into a storage medium, having a light source for generating a light beam, having recording means for acquiring the image data generated by the light beam by illuminating the lithogram, and having display means for displaying the display data generated from the image data, wherein all the components are combined in a portable handheld unit. This reader solves the object of specifying a manageable reader which has great variability in reading the information contained in the dot distribution of a computer-generated lithogram.

19 Claims, 7 Drawing Sheets

READER FOR READING COMPUTER-GENERATED LITHOGRAMS

BACKGROUND OF THE INVENTION

The present invention relates to a reader for reading computer-generated lithograms.

Computer-generated lithograms are two-dimensional matrices, preferably having very small dimensions, which consist of individual dots with different optical properties. The lithograms are preferably formed as holograms, but microtexts or micropictures that can be read directly, that is to say without diffraction of the incident light, can also be generated with the lithograms.

By means of illuminating a computer-generated hologram, for example with a coherent electromagnetic wave, in particular a light wave, images and/or data are reproduced by diffraction in transmission or reflection. The different optical properties of the individual dots can be reflective properties, for example arising from surface topography, varying optical path lengths in the material of the storage medium (refractive indices) or color values of the material.

The optical properties of the individual dots are calculated by the computer, and these are thus what are known as computer-generated holograms (CGH) or, generally, computer-generated lithograms. With the aid of the focused write beam, the individual dots of the lithograms are written into the material during writing, the focus lying in the region of the surface or in the material of the storage medium. In the region of the focus, focusing has the effect of a small area of action on the material of the storage medium, so that a large number of dots of the lithogram can be written in a small region.

By means of scanning an intensity-modulated write beam, an area with an irregular dot distribution, the computer-generated lithogram, is thus produced. This can be employed for marking, identifying and individualizing any desired objects.

During the production of lithograms, a resolution of about 25 000 dpi is preferred. In addition, in computer-generated lithography, only comparatively small areas are inscribed. These are, for example, 1 to 5 mm$^2$ in size, other sizes also being possible. The accuracy of the writing pattern in the case of a lithograph for producing digital holograms of, for example, 1000×1000 dots on an area of 1×1 mm$^2$ must be about ±0.1 µm in both orthogonal directions. Furthermore, the writing speed should be approximately 1 Mpixel/s, in order that in each case a lithogram can be written in the time of about 1 s or less.

The computer-generated lithograms explained previously can carry different information. Firstly, the computer-generated lithogram can carry an item of holographic information which, when read, that is to say during reproduction, reproduces a directly legible item of information (text, image, graphic). Likewise, the information read out can be encrypted, in particular digitized. The reproduced hologram then contains, for example, a digital matrix similar to a one-dimensional or two-dimensional bar code. Finally, the dot distribution of the computer-generated lithogram can intrinsically have an item of directly legible information with very small dimensions, for example a microtext or a micropicture. For the purpose of detection, magnification of the directly legible microtext is necessary, that is to say a procedure different from reading the digital hologram. The microtext and/or the micropicture itself can in turn be encrypted. For example, a micropicture can itself represent an item of digital information like a one-dimensional or two-dimensional bar code. Of course, a lithogram can contain both holographic information and directly legible information, that is to say a combination of all the possibilities illustrated.

In order to read computer-generated holograms, simple handheld readers are known from the prior art. As a rule, these make use of a light beam to generate the reproduced hologram on a screen.

Furthermore, nonportable, permanently installed readers are known, which display the information read on a computer monitor.

The technique of using computer-generated lithograms has recently led to various applications in which individual products are provided with small labels, on which a hologram is written in each case. The lithograms used can be individualized and/or coded in a number of stages; any desired combination of microtexts and micropictures, directly legible holographic information and information stored in coded form in the hologram, for example digitized information, can be combined with one another. A [lacuna] for checking the various items of information with a reader has previously not been possible, in particular not with a handheld reader.

SUMMARY OF THE INVENTION

The present invention is based on the technical problem of specifying a manageable reader which has great variability in reading the information contained in the dot distribution of a computer-generated lithogram.

According to the invention, the technical problem indicated previously is solved by a reader having the features of claim 1. Further preferred refinements of the reader are specified in the subclaims.

According to the invention, the reader for reading computer-generated lithograms which are written in a storage medium is provided with a light source for generating a light beam, with recording means for registering the image data generated by the light beam as a result of illuminating the lithogram, and with display means for displaying the display data generated from the image data, all the components being combined in a portable handheld unit.

The term handheld unit is derived from the area of application of the portable computer, which is also designated a handheld computer or a personal digital assistant (PDA). Here, too, all the computer functions are arranged in a small manageable housing, so that a computer is produced which can be used in a mobile fashion, not bound to a fixed location. The same principle is applied in the present invention to the handheld reader for reading computer-generated lithograms. All the aforementioned basic components, and also all further components described in the following text, are combined in a manageable unit, that is to say a handheld unit. The reader will therefore also be designated a handheld reader in the following text.

The handheld reader is suitable for aiming the light beam, which in particular can be formed as a laser beam, onto the computer-generated lithogram and for recording the reproduced hologram generated by diffraction effects and/or the directly legible micropicture. In this case, the handheld reader is brought up to the object carrying the lithogram, for example to a package of a product, in such a way that the light beam strikes the lithogram.

It is likewise possible, in the case of objects with a defined form, to provide a holder, into which the object with the storage medium or the storage medium itself is introduced and is positioned. The holder is therefore suitable in particular for check cards or the like.

The recording means are preferably electronic, in particular formed as a conventional CCD chip or as a CMOS chip. As a result, inexpensive use of a standard technique for the handheld reader becomes possible.

In a first preferred refinement of the present invention, the recording means are connected directly to the display means and the display means display the image data as display data. As a result, the checking of the reproduced hologram in a straightforward manner is made possible, in order to be able to identify directly legible information contained therein.

As an advantageous display means, for example, conventional displays for mobile telephones can be used. An economical solution can also be created by this measure.

In a further preferred refinement of the present invention, evaluation means are provided for evaluating the image data and generating the display data. Thus, the image data generated by the recording means can be subjected to analysis.

In this case, the evaluation means and the display means are preferably formed as a portable handheld computer. In this way, a standard technique can also be used for an inexpensive configuration of the handheld reader.

The analysis of the image data can be carried out in such a way that one or more regions of the image data are selected and displayed separately one after another or in parallel as display data on the display means. As a result, the image data can be enlarged and/or displayed in a specific selection. Likewise, all of the image data can be displayed as display data.

A further analysis of the image data is to derive the display data at least partly from the image data. This can be used when the reproduced hologram contains data in coded form. For example, it is known to store one-dimensional or two-dimensional bar codes in a computer-generated hologram. These bar codes can then be detected in the reproduced hologram as dark and light regions. The information hidden in the bar code can then be determined only by means of further analysis. Following the analysis, this information can then be displayed on the display means as legible text.

In order to be able to change over between the display of the reproduced hologram and the data determined therefrom, switching means are preferably provided for setting the type of image data. Likewise, a setting can therefore be chosen in which the various information (micropicture, hologram, derived information) is displayed simultaneously on the display means.

Likewise, storage means for storing a plurality of items of recorded image data can be provided. Thus, a series of computer-generated holograms can be analyzed without data transmission or data saving having to be carried out in the meantime. In this case, it is in particular sufficient if only the directly legible information or information derived from a coded form is stored in binary form.

A further refinement of the present invention relates to a magnifying lens as an adjusting means. The magnifying lens is used for improved freehand adjustment of the reader relative to the position of the lithogram. The user of the reader can observe the position of the light beam on the storage medium or on the object in an enlarged illustration directly through the magnifying lens. If the light spot covers exactly the region which is occupied by the lithogram, the user can activate a trigger in order to have the recording means record the image data.

The magnifying lens can be arranged outside or inside the beam path of the light beam. Depending on the arrangement, therefore, the light beam will be influenced by the magnifying lens. Therefore, when the magnifying lens is arranged in the beam path, it is necessary to aim the light beam in a divergent manner onto the magnifying lens, in order that the light beam behind the magnifying lens largely represents a parallel bundle of rays and is not focused on the observation plane.

Finding the small lithogram with only the laser beam under certain conditions is possible only under conditions that are made more difficult. It is therefore preferred to provide a further light source, in particular an LED producing white light, which illuminates the search area and makes it easier to detect the position of the small lithogram.

It is likewise possible for the evaluation means to analyze the image data detected continuously by the recording means and, given a suitable position of the reproduced hologram, to record the image data on the recording means. This analysis can be carried out by using predefined information units, for example a recognition pattern, within the reproduced hologram. If the information units can be detected by the evaluation means at predetermined positions relative to the image plane of the recording means, the image data is recorded.

In order to signal the recording of the image data to the user, an acoustic and/or optical signal generator is provided. If the signal generator is activated, the user recognizes that the hologram to be read by him has been detected and, if appropriate, stored.

Instead of the eye of the user or in addition thereto, further recording means for recording the light reflected from the storage medium can be provided. Thus, the dot distribution of the computer-generated lithogram per se, that is to say not the reproduced hologram, is acquired, in order for example to be able to acquire the miniaturized picture or microtext and display it on the display means. The user can then check on the display means the position of the light beam on the object or on the storage medium on the display means and thus adjust the handheld reader.

Thus, in a handheld reader, it is possible to display the dot distribution with any microtext or micropictures that may be present. This also applies on its own, that is to say without the handheld reader also having to be able to process a reproduced hologram.

However, it is preferred if the handheld reader, in addition to detecting the microtext or the micropicture, can also display the reproduced hologram with information contained therein and/or the information derived from the reproduced hologram on the display means. The various security features of the lithogram written on the storage medium can thus be displayed as desired.

In a further preferred embodiment of the present invention, at least the light source and the recording means are arranged in an optical block, while at least the evaluation means and the display means are arranged in an evaluation block. The optical block and the evaluation block are connected to each other via an electronic and/or optical interface and/or a radio interface, so that the image data generated by the recording means can be transmitted to the evaluation means. This construction produces a modular structure, so that it is possible to react flexibly to changes in one of the two different functional blocks by replacing one of the two blocks.

In order, in spite of the modularity of the two blocks described, to form a handheld unit, the optical block and the evaluation block are arranged on a common holder. This holder can also be part of one of the two blocks, for example the optical block, in which the other block, for example the evaluation block, can be placed.

The modular structure benefits in particular from the fact that the evaluation block is formed as a mass-produced handheld computer (PDA). Since technical development is proceeding very fast in this field and the product cycles are very short, a current, newer model of a handheld computer can be used as a replacement for a damaged evaluation block. The interfaces are therefore preferably likewise standardized, in order to ensure the interchangeability of the two blocks in relation to each other.

BRIEF DESCRIPTION OF THE DRAWINGS

In the following text, the invention will be explained in more detail using exemplary embodiments, reference being made to the appended drawing, in which.

DETAILED DESCRIPTION OF THE INVENTION

Figure 1:
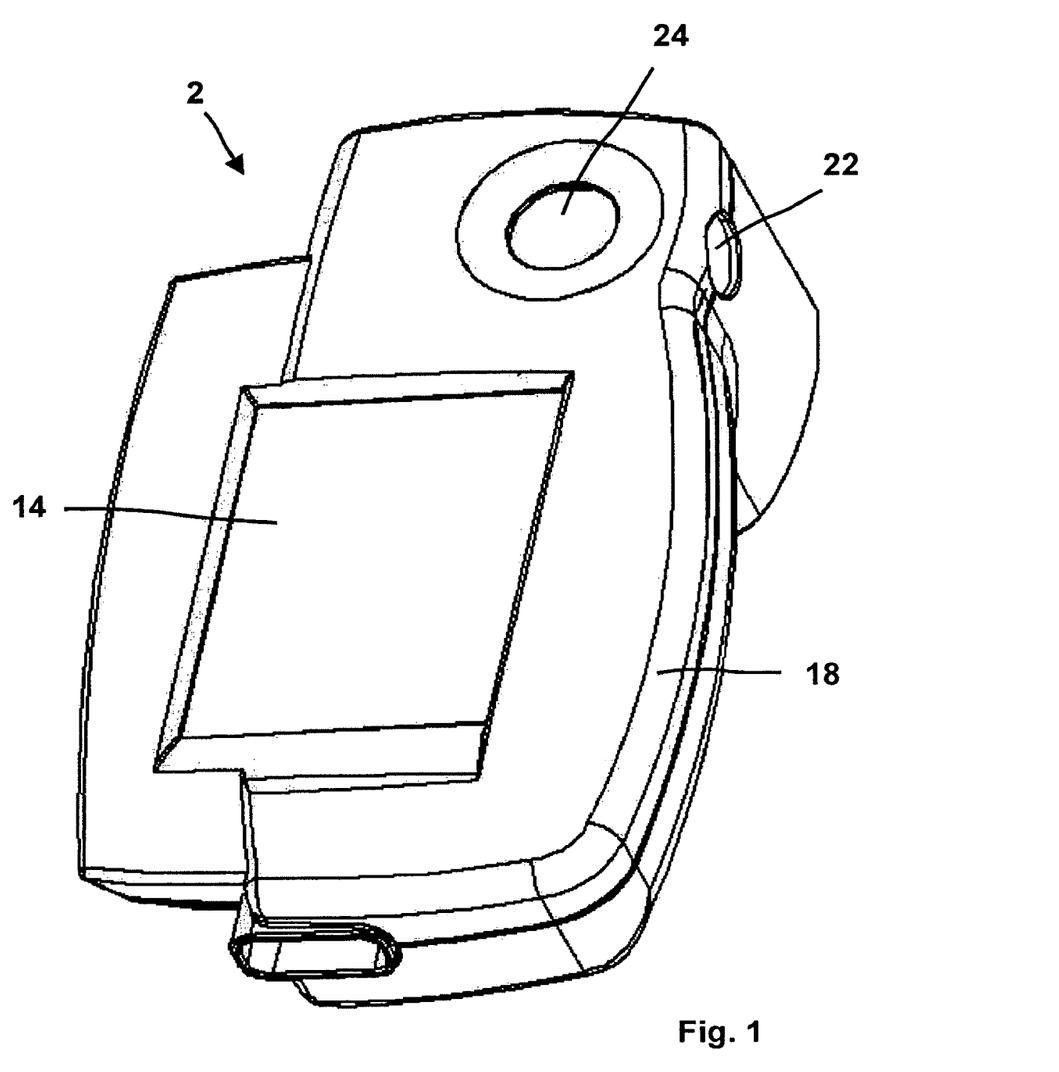
FIG. 1 shows an exemplary embodiment of a handheld reader according to the invention in a perspective illustration.

FIG. 1 shows for a first exemplary embodiment of a handheld reader 2 according to the invention, whose internal structure will firstly be explained by using various embodiments, before the features that are visible from the outside are discussed per se.

Figure 2:
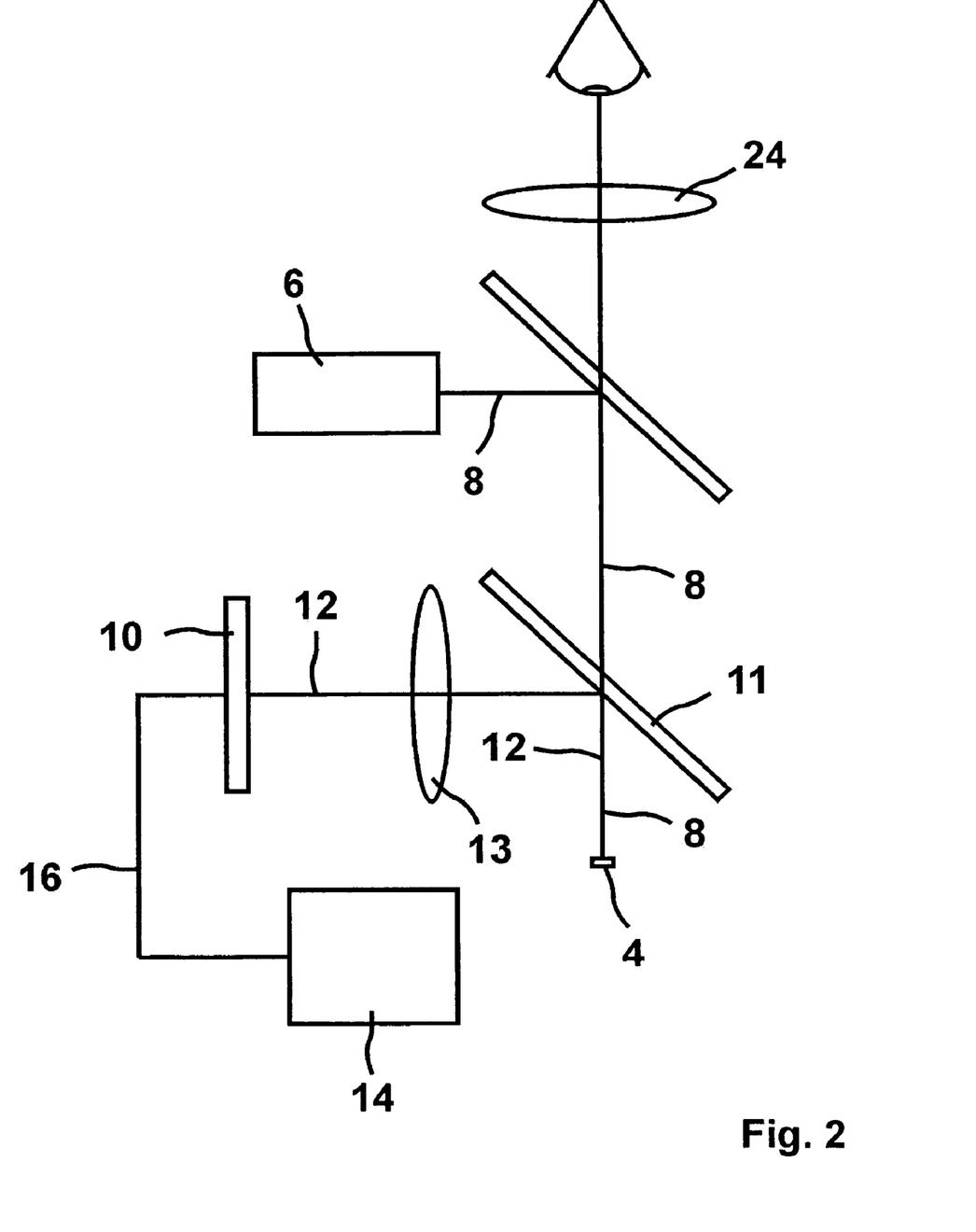
FIG. 2 shows a first exemplary embodiment of the structure of the components of the handheld reader in a schematic illustration.

FIG. 2 shows, in a schematic illustration, a first exemplary embodiment of a structure of the components of the handheld reader, with which the information which is contained in a dot distribution of a computer-generated lithogram written on a storage medium 4 can be acquired.

The structure has as basic components a light source 6 for generating a light or laser beam 8, recording means 10 for acquiring the image data of the hologram reproduced from the dot distribution of the lithogram by the light beam 8 (beam path 12) and display means 14 for displaying the display data generated from the image data. The recording means 10 are connected to the display means 14 via a data line 16. In the structure illustrated in FIG. 2, a beam splitter 11 and a projection lens 13 are additionally provided in order to couple the light of the reproduced hologram out of the beam path of the light beam 8 and in order to achieve a suitable image of the reproduced hologram on the image plane of the recording means 10.

All the components 6, 10 and 14 (and also, likewise, further components of the reader described in the following text) are combined in a portable handheld unit. This can be seen in particular in FIG. 1 in the housing 18 of the handheld unit. The housing 18 has, inter alia, the display means 14 which can be seen from outside and which, for example, is formed as a flat monitor, in particular as a display of a mobile telephone or as a monitor of a handheld computer (PDA). The housing 18 has an ergonomic external shape and can easily be held in one hand by a user.

The recording means 10 illustrated in FIG. 2 are electronic, for example formed as a conventional CMOS or CCD chip. Therefore, a conventional and thus inexpensive standard technology is also used at this point.

Figure 6A:
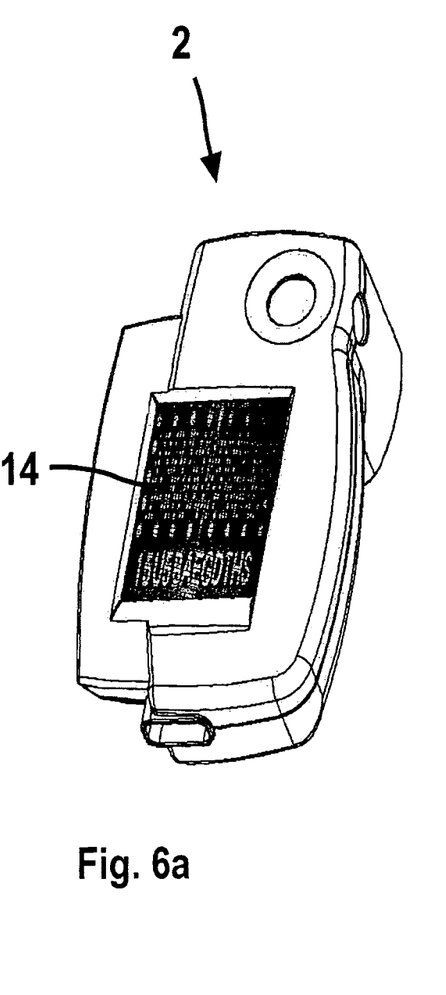
FIGS. 6a-c show illustrations of the handheld reader with different pictorial contents of the display means and FIG. 7 shows an exemplary embodiment of a handheld reader according to the invention with a modular structure in a perspective illustration.

In the exemplary embodiment illustrated in FIG. 2, the recording means 10 are connected directly to the display means 14, and the display means 14 display the image data directly as display data. This is shown in FIG. 6a. The display means 14 display the image data in the manner in which they have been generated by the recording means 10. It is possible to detect the hologram reproduced from the storage medium 4 having a black/white pattern of individual regions of a two-dimensional bar code in the upper section of the hologram, and a combination of symbols comprising letters and numbers at the lower edge of the hologram.

Figure 3:
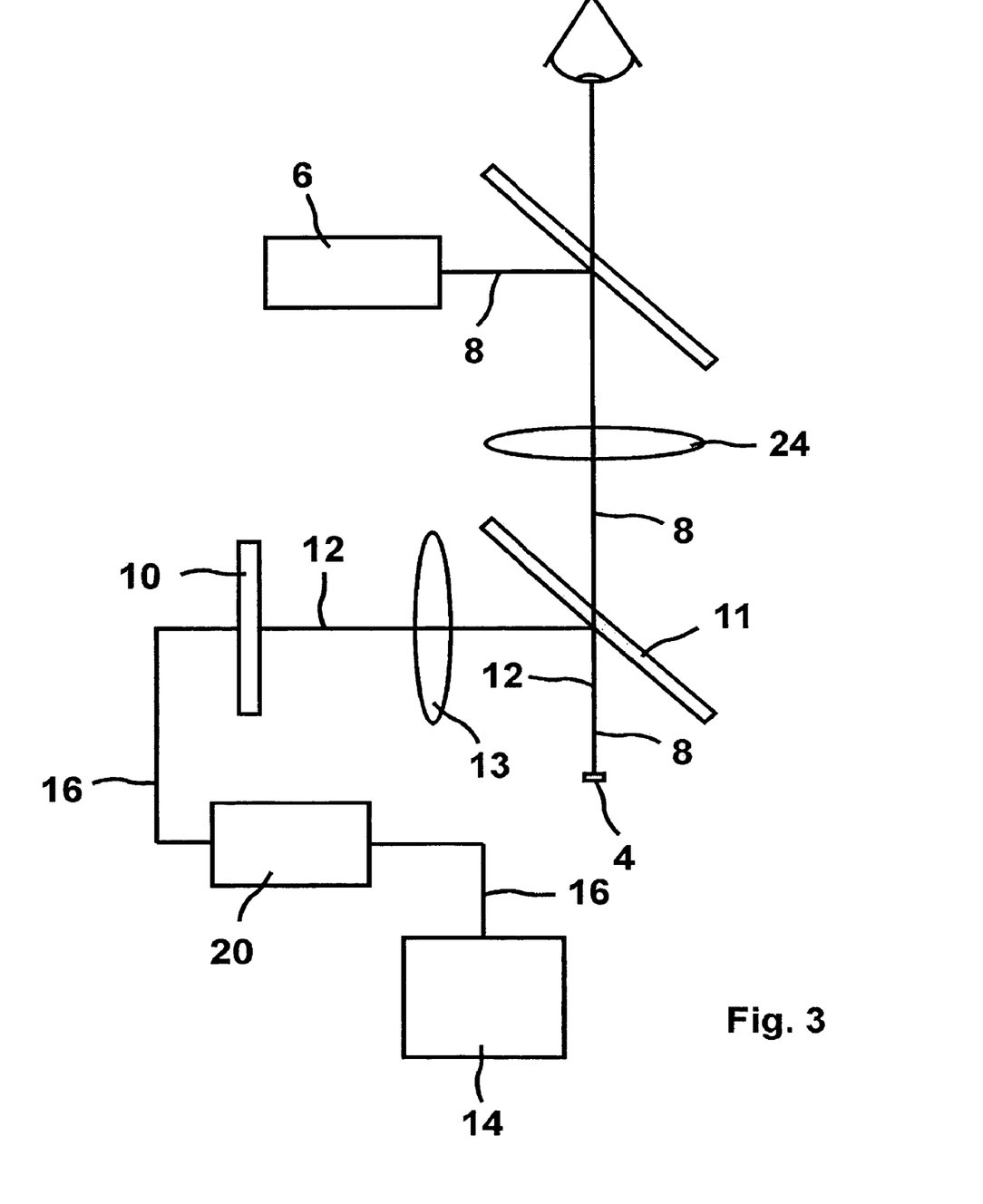
FIG. 3 shows a second exemplary embodiment of the structure of the components of the handheld reader in a schematic illustration.

FIG. 3 shows a second exemplary embodiment of a handheld reader 2 according to the invention, in which identical designations identify identical components, as have been explained previously using the first exemplary embodiment.

In addition to the structure already described, in the second exemplary embodiment, evaluation means 20, which are connected to the recording means 10 and the display means 14 via data lines 16, are provided. Using the evaluation means 20, the image data is evaluated and the display data is generated. The evaluation means 20 are electronic and comprise at least one microprocessor, storage means and input and output interfaces. The storage means are used in this case in particular for storing a plurality of items of recorded image data or evaluation data. Here, too, recourse can be had to conventional and thus inexpensive technology, for example a handheld computer (PDA) can be used as display means 14 and evaluation means 20.

With the aid of the evaluation means 20, it is possible to prepare the image data before display. In this case, firstly, the display data can comprise at least part of the image data, preferably all of the image data. Secondly, the display data can represent at least part of the data derived from the image data. In other words, the display data could firstly be one or more parts of the image data recorded by the recording means 10. On the other hand, the display data can contain the information which is generated by the evaluation of the information contained in the reproduced hologram. In this regard, reference is again made to an image of a one-dimensional or two-dimensional bar code, whose information can be obtained only following evaluation of the bar code pattern.

Figure 6B:
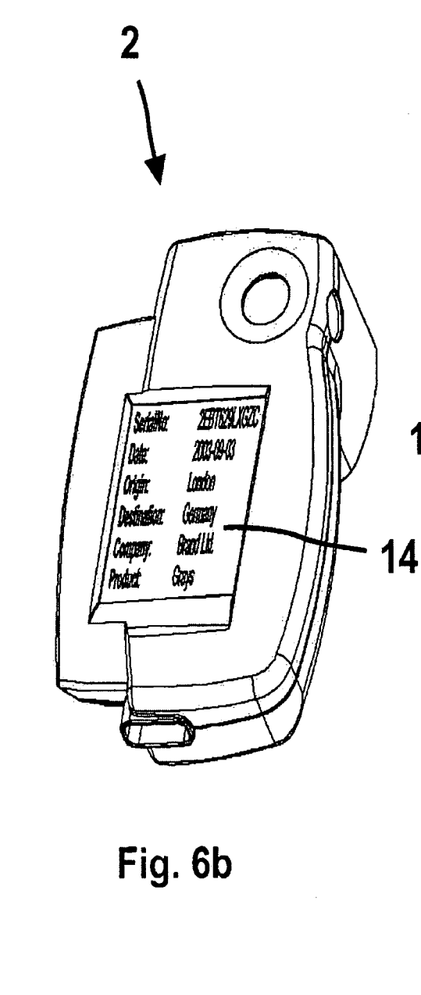

The two different information contents of the items of information displayed on the display means 14 are illustrated in FIGS. 6a and 6b. While the handheld reader according to FIG. 6a—as already described—shows the image data of the reproduced hologram recorded by the recording means 10, in the case of the handheld reader according to FIG. 6b, the information from the two-dimensional barcode of the reproduced hologram is displayed legibly in text. In the present case, this is an example of production data from a commercially available product which, during production, has been provided with a forgery-proof hologram label. It is thus possible for the originality of the product to be checked. For this purpose, use is likewise made of the sequence of symbols in the reproduced hologram according to FIG. 6a. It is also possible to draw conclusions about the originality of the product from this sequence of symbols, possibly only in combination with the derived data according to FIG. 6b.

Moreover, it can be seen in FIG. 1 that switching means 22 in the form of a trigger for setting the type of image data are provided. Therefore, the user can change over between the display modes illustrated in FIG. 6. Likewise, it is possible to combine various display modes with one another, that is to say to combine at least two of the display contents illustrated in FIG. 6 with one another.

As illustrated in FIGS. 2 and 3, the handheld reader 2 has a magnifying lens 24 as adjusting means. The magnifying lens 24 makes it possible for a user (indicated by the eye) to observe directly the region of the storage medium 4 illuminated by the light beam 8, or the object on which the storage medium 4 is arranged. Since the region occupied by the computer-generated lithogram can have a dimension of 1 mm$^2$ or less, it is not entirely simple to hit the lithogram without magnification.

For this purpose, not illustrated in the figures, a further light source can be provided, which illuminates the region of the lithogram, in particular with white light. As a result, the ability to detect the lithogram is improved. The light source can be formed as an LED. In addition, a target or crosswire can also be illuminated, whose reflected image can be registered by the viewer or by the further recording remains explained below.

In FIG. 2, the magnifying lens 24 is arranged outside the beam path of the light beam 8, so that the light beam 8 is not influenced by the lens 24. This configuration can also be seen in FIG. 1. In the upper right-hand corner of the front side of the handheld reader 2, it is possible to see the magnifying lens 24, through which the user can observe the storage medium.

In FIG. 3, the magnifying lens 24 is arranged within the beam path 8. This structure results in the light beam 8 being generated by the light source 6 with a slight divergence, which is cancelled when it passes through the magnifying lens 24.

A further aid when adjusting the handheld reader relative to the storage medium 4 is that the evaluation means 20 according to FIG. 3 continually analyze the image data acquired by the recording means 10 and, given a suitable position of the reproduced hologram, record the image data on the recording means 10. The adjustment procedure is therefore assisted by the evaluation means, so that the adjustment carried out by hand can proceed more quickly and more reliably.

Furthermore, an acoustic and/or optical signal generator can be provided, which is activated when the evaluation means 20 have determined the optimum adjustment. The user is therefore informed immediately when the reproduction of a hologram has been recorded successfully.

Figure 4:
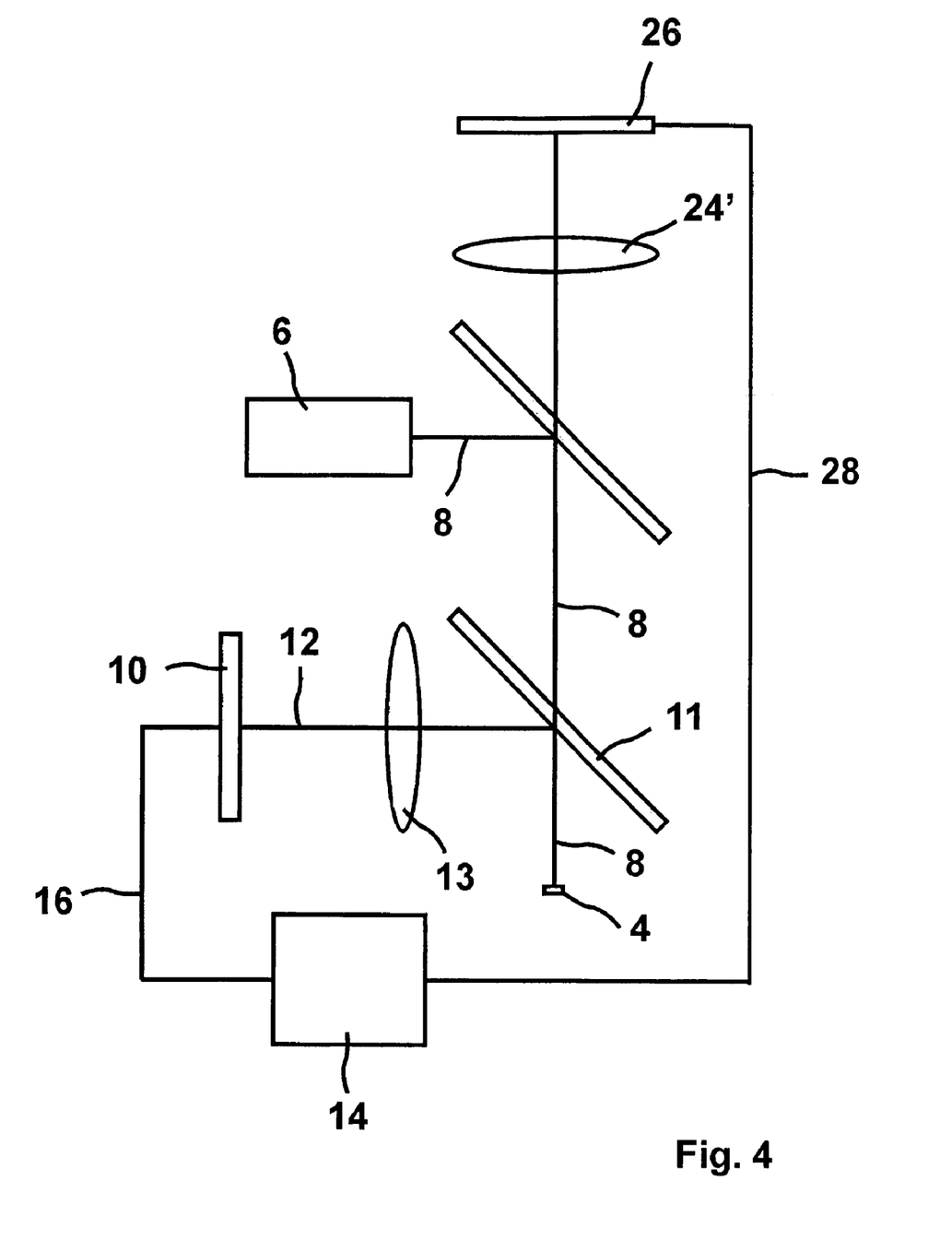
FIG. 4 shows a third exemplary embodiment of the structure of the components of the handheld reader in a schematic illustration.

FIG. 4 shows a third exemplary embodiment of a handheld reader according to the invention, identical designations identifying identical components, as have been explained previously using the first two exemplary embodiments. The structure of the third exemplary embodiment corresponds substantially to the structure of the first exemplary embodiment.

In the third exemplary embodiment, recording means 26 are provided for recording the light reflected from the storage medium 4. The recording means 26 therefore replace the eye of the user of the handheld reader 2. The recording means 26 are connected to the display means 14 via a data line 28, so that the real image of the storage medium 4 can be displayed directly and observed by the user.

When configuring the optics, it is necessary to take account of the fact that the magnifying lens 24' has a different focal length than the magnifying lens 24 in FIG. 2, in order that the projection of the area of the lithogram onto the recording means is improved, that is to say is magnified more highly.

This technical success can also be achieved by means of an additional lens that can be pivoted into the beam path, in order firstly to display a larger area for searching for the lithogram and secondly to offer a higher magnification for detecting the microtext or the micropicture.

Figure 5:
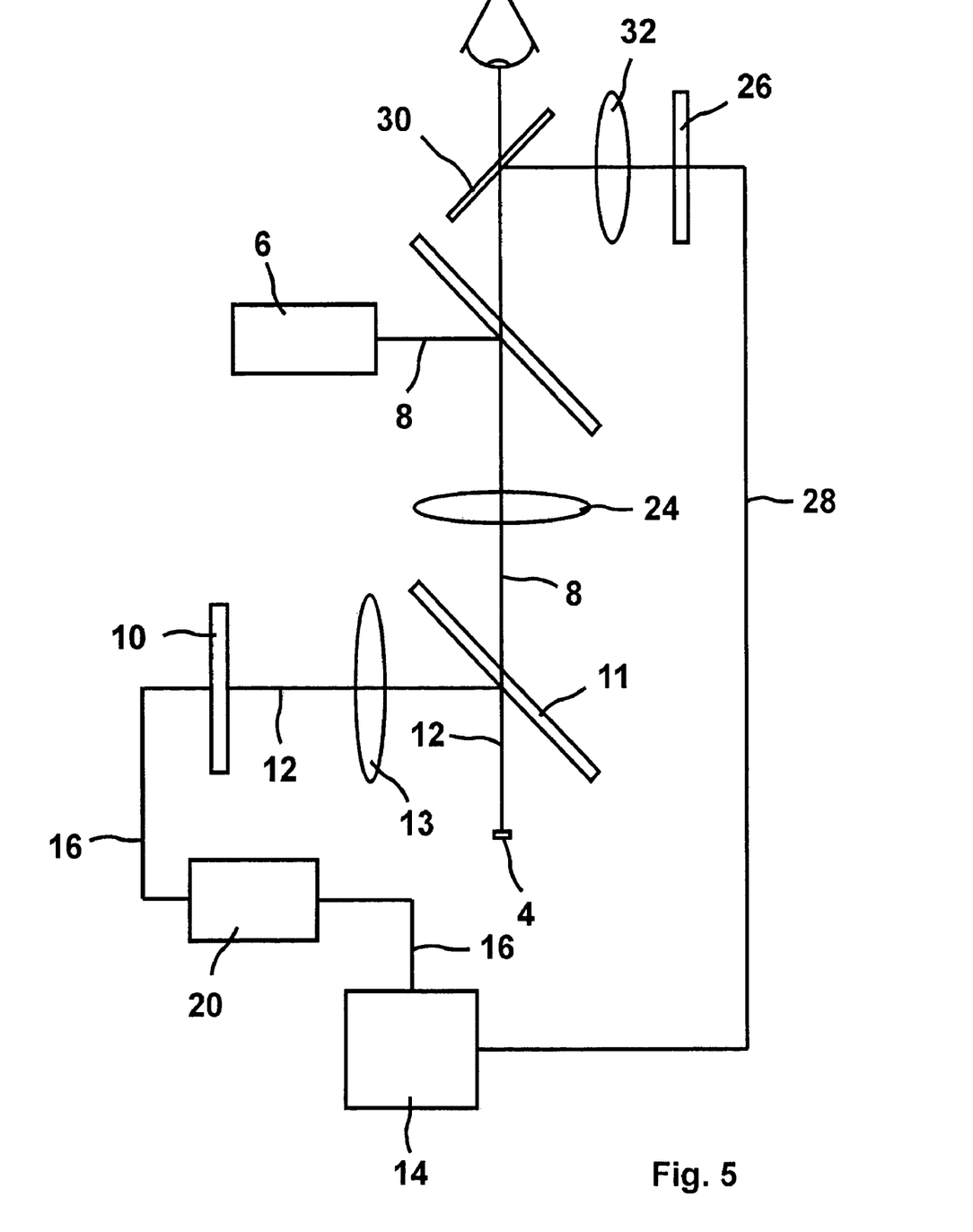
FIG. 5 shows a fourth exemplary embodiment of the structure of the components of the handheld reader in a schematic illustration.

FIG. 5 shows a fourth exemplary embodiment of a handheld reader according to the invention, identical designations identifying identical components, as have been explained previously using the first three exemplary embodiments. The structure of the fourth exemplary embodiment corresponds substantially to the structure of the second exemplary embodiment.

In the fourth exemplary embodiment, recording means 26 are likewise provided for recording the light reflected from the storage medium 4. The recording means 26 represent an alternative to the eye of the user of the handheld reader 2. This is because the recording means 26 are coupled in via a beam splitter 30, without interfering with the direct path for the observing eye. The recording means 26 have additional magnifying optics 32 and are connected to the display means 14 via a data line 28, so that the real image of the storage medium 4 can be displayed directly and observed by the user.

Figure 6C:
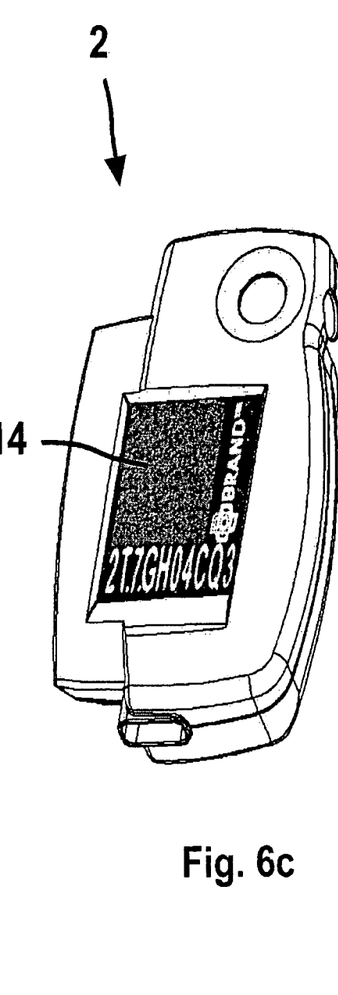

The representation of the real image of the dot distribution of the lithogram is illustrated in FIG. 6c. Here, it is possible to see the dot distribution of the computer-generated lithogram in the left-hand upper corner and a sequence of symbols in microtext and a logo as a micropicture.

Depending on the structure of the third or fourth exemplary embodiment, the images illustrated in FIGS. 6a and 6b can also be displayed on the display means 14 when observing the hologram.

Figure 7:
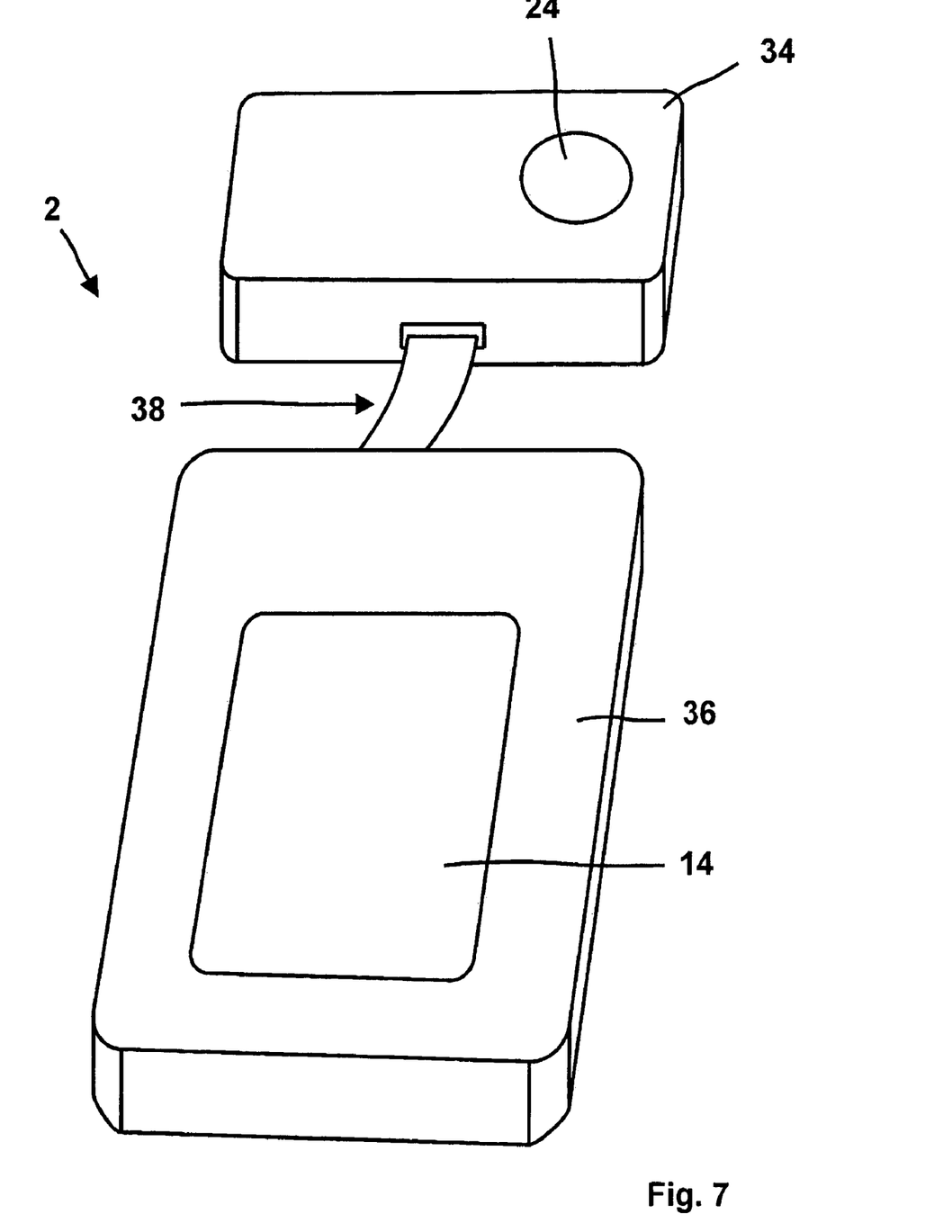

FIG. 7 shows a further refinement of the present invention. In the exemplary embodiment illustrated, the handheld reader 2 is subdivided into an optical block 34 and an evaluation block 36, that is to say constructed modularly.

In the interior, the optical block 34 has at least the light source and the recording means and also possible further components previously described. The evaluation block 36 has at least the evaluation means and the display means 14. The optical block 34 and the evaluation block 36 are connected to each other via an electronic interface 38. The electronic interface has, for example, a flat ribbon cable and corresponding plug-in connections on both sides. In this case, the standard interfaces for interface cards, for example a CompactFlash card (CF plug-in card) are possible. The interface can also be formed optically, for example as an infrared interface, or as a radio interface.

The optical block 34 and the evaluation block 36 are preferably arranged on a common holder (not illustrated), in order to form the handheld unit and to be easier to handle. In this case, one of the two blocks 34 or 36 can have a holder formed integrally therewith, into which the respective other block can be inserted. In this case, the optical block 34 preferably has the holder.

This is because it is preferable for the evaluation block 36 to be formed as a mass-production handheld computer. Therefore, in combination with the optical block 34 subjected to less change over time, a combination which can be used in the long term is created, in which replacement of the late evaluation unit 36 is possible even when the original handheld computer can no longer be repurchased.

The invention claimed is:

1. A reader for reading computer-generated individualized holograms which are written into a storage medium, comprising:
   a light source for generating a light beam;
   recording means for acquiring image data generated by the light beam by illuminating the individualized hologram;
   display means for displaying display data generated from the image data; and
   a magnifying lens to observe the storage medium for adjusting the reader,
wherein all the components are combined in a portable handheld unit.

2. The reader as claimed in claim 1, wherein the recording means are electronic.

3. The reader as claimed in claim 1, wherein the recording means are connected directly to the display means and the display means display the image data as display data.

4. The reader as claimed in claim 1, wherein the display means is formed as a conventional display for mobile telephones.

5. The reader as claimed in claim 1, wherein evaluation means are provided for evaluating the image data and for generating the display data.

6. The reader as claimed in claim 5, wherein the evaluation means and the display means are formed as a portable handheld computer.

7. The reader as claimed in claim 5, wherein the display data comprises at least part of the image data.

8. The reader as claimed in claim 5, wherein the display data comprises at least part of data derived from the image data.

9. The reader as claimed in claim 5, wherein switching means are provided for setting a type of image data.

10. The reader as claimed in claim 5, wherein the evaluation means analyze the image data acquired continuously by the recording means and, given a suitable position of a reproduced hologram, record the image data on the recording means.

11. The reader as claimed in claim 10, wherein an acoustic and/or optical signal generator is associated with the recording means for providing a signal to indicate that the image data has been acquired.

12. The reader as claimed in claim 5, wherein:
    at least the light source and the recording means are arranged in an optical block;
    at least the evaluation means and the display means are arranged in an evaluation block; and
    the optical block and the evaluation block are connected to each other via an electronic and/or optical interface.

13. The reader as claimed in claim 12, wherein the optical block and the evaluation block are arranged on a common holder.

14. The reader as claimed in claim 12, wherein the evaluation block is formed as a mass-production handheld computer.

15. The reader as claimed in claim 1, wherein storage means are provided for storing a plurality of items of recorded image data.

16. The reader as claimed in claim 1, wherein the magnifying lens is arranged outside or inside a beam path of the light beam.

17. The reader as claimed in claim 1, wherein a second light source is provided for illuminating the hologram.

18. The reader as claimed in claim 1, wherein the recording means are provided for recording light reflected from a storage medium.

19. The reader as claimed in claim 1, wherein the image data comprises a dot distribution of the hologram.

* * * * *